US008732197B2

(12) United States Patent
Musgrove

(10) Patent No.: US 8,732,197 B2
(45) Date of Patent: May 20, 2014

(54) METHOD AND APPARATUS FOR ALIGNING MULTIPLE TAXONOMIES

(75) Inventor: Timothy A. Musgrove, Morgan Hill, CA (US)

(73) Assignee: Musgrove Technology Enterprises LLC (MTE), Morgan Hill, CA (US)

( * ) Notice: Subject to any disclaimer, the term of this patent is extended or adjusted under 35 U.S.C. 154(b) by 238 days.

(21) Appl. No.: 12/025,200

(22) Filed: Feb. 4, 2008

(65) Prior Publication Data

US 2009/0037457 A1 Feb. 5, 2009

Related U.S. Application Data

(60) Provisional application No. 60/899,040, filed on Feb. 2, 2007.

(51) Int. Cl.
*G06F 17/30* (2006.01)

(52) U.S. Cl.
USPC .............................. 707/776; 707/777; 707/797

(58) Field of Classification Search
USPC .......... 707/999.102, 705, 749, 755, 756, 776, 707/777
See application file for complete search history.

(56) References Cited

U.S. PATENT DOCUMENTS 6,453,315 B1 * 9/2002 Weissman et al. ..... 707/999.003
6,665,681 B1 12/2003 Vogel
2001/0037324 A1 11/2001 Agrawal et al.
2004/0139059 A1 7/2004 Conroy et al.
2006/0004747 A1 1/2006 Weare
2006/0235870 A1 10/2006 Musgrove
2008/0154875 A1 * 6/2008 Morscher et al. .................. 707/5

OTHER PUBLICATIONS

Beneventano D., et al. 2003. "Building an Integrated Ontology within SEWASIE System", Proceedings of the First International Workshop on Semantic Web and Data-bases (SWDB).
Gaurino, N. 1998. "Formal Ontology and Information Systems", Proceedings of the International Conference on Formal Ontology in Information Systems (FOIS'98), Trento, Italy.
Leacock, Claudia, et al. 1998. "Using Corpus Statistics and WordNet Relations for Sense Identification", Computational Linguistics, 24(1): 147-165.
Martin, T., 2004. "Acquisition of Soft Taxonomies", IPMU-04.
Miller, George A., 1995. "WordNet: A Lexical Database for English". Communications of the ACM. 38(11):39.
International Search Report mailed Jul. 23, 2008 for PCT/US2008/52893.

* cited by examiner

*Primary Examiner* — Vincent F Boccio
(74) *Attorney, Agent, or Firm* — Nixon Peabody LLP

(57) ABSTRACT

A document taxonomy alignment system and method, relying on document glosses and utilizing a soft ontology expansion. An all-new hierarchical leaf node can be created expressly for the purpose of better aligning the plurality of document taxonomies in question. A small but valuable subset of the nodes created by soft ontology expansion turn out to capture some otherwise unmappable taxonomy nodes, and thereby have the effect of classifying the documents better than would any pre-existing node in any one of those taxonomies.

18 Claims, 2 Drawing Sheets

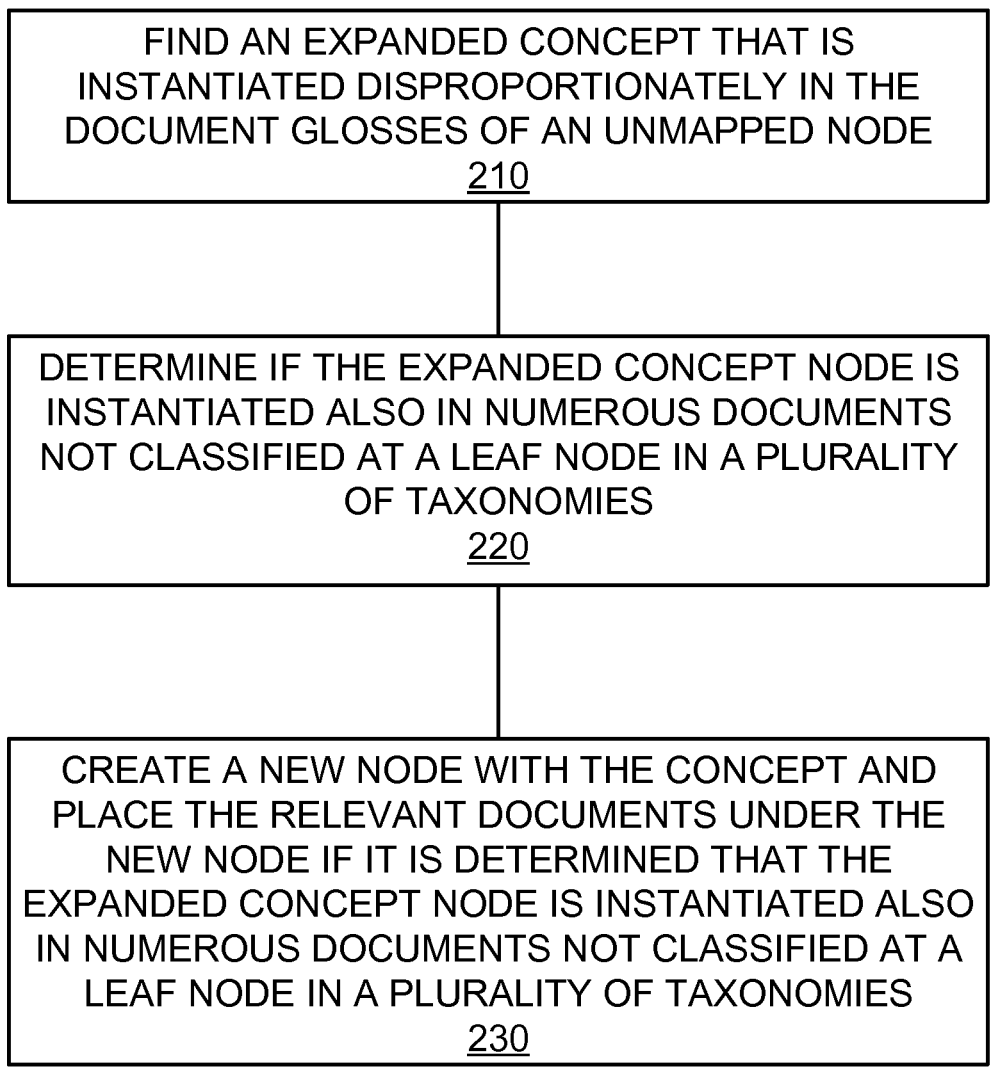

METHOD AND APPARATUS FOR ALIGNING MULTIPLE TAXONOMIES

BACKGROUND OF THE INVENTION

It is common to organize information in a categorization scheme known as a "taxonomy". Taxonomies ordinarily are hierarchal constructs of categories as nodes. Information is assigned to a node of the taxonomy based on the content of the information. For example www.yahoo.com organizes documents of various domains in a taxonomy to allow users to search and browse the information by category. taxonomies are somewhat arbitrary in that each may use a different set of categories and may organize those categories in various ways. It is often desirable to "align" two or more taxonomies to create a single browsable document collection. When attempting to align document taxonomies, there are frequently "isolated nodes", i.e. categories of documents in one taxonomy seeming to have no correlate in the other taxonomies. An example is in the Archery category on Yahoo (www.yahoo.com), the sub-category of "Kyudo" (traditional Japanese archery). Unfortunately, at the time of testing, there was no equivalent to this category on DMOZ (Open Directory Project) or About.com. Previously, in order to map such taxonomies to one another, it was necessary to manually edit the taxonomies. Manual editing is cumbersome and not pragmatic on a large scale.

BRIEF DESCRIPTION OF THE DRAWING

FIG. 2 is a flow diagram showing a method in accordance with an embodiment of the invention.

DETAILED DESCRIPTION

Figure 1:
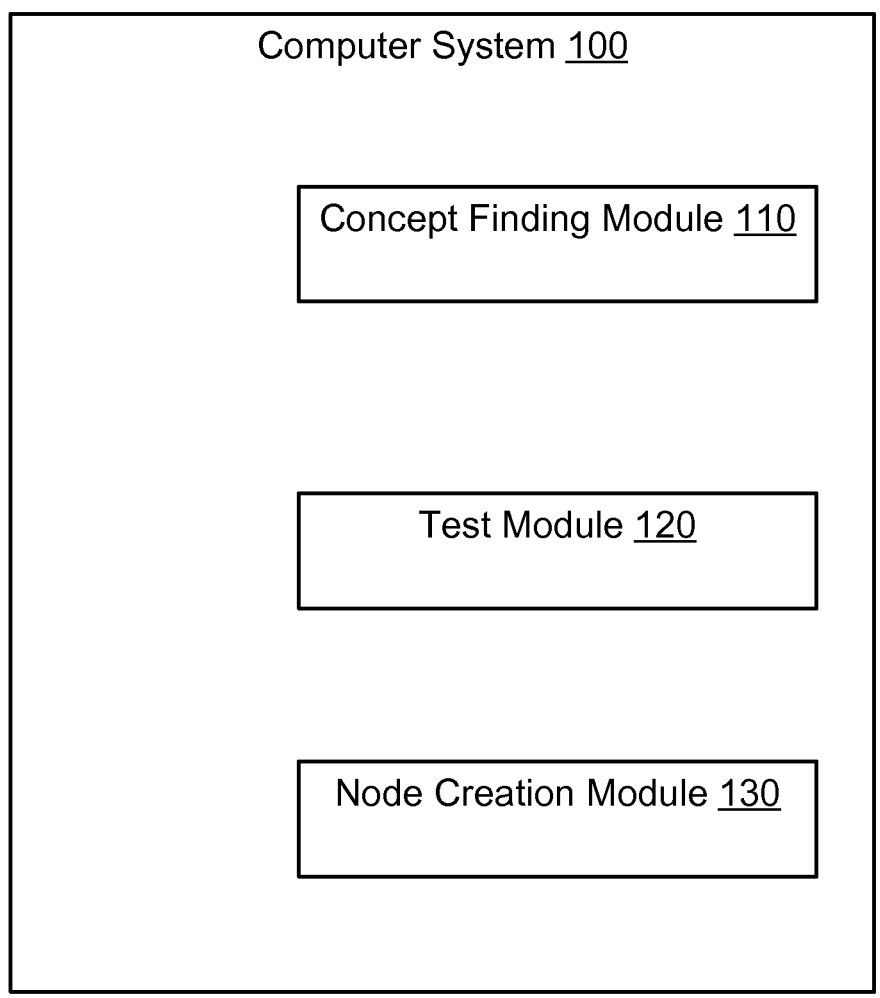
FIG. 1 is a schematic representation of a computer system in accordance with an embodiment of the invention and for accomplishing a method of the embodiment.

The inventor has created a soft ontology expansion to assist in the alignment of taxonomies which can produce numerous candidate ontology nodes, such as "coaching/training" and "competitions/tournaments" and so on. The invention is a methodology that can be implemented on a computing device, such as a general purpose programmable computer that is programmed to accomplish the functional steps of the invention.

In a preferred embodiment, the archery taxonomies noted above are used as an example. In this example one candidate ontology node of particular interest is "traditional archery." While not a node in any of three reference taxonomies, "traditional archery" nonetheless applied to a great number of documents in all three, and especially in Yahoo's apparently unique "Kyudo" category. Having used DMOZ as a "master taxonomy", we then tried adding not only "traditional archery", but every other similar example, with the result that, in the archery topic tree, we ended up adding three new nodes:
Traditional Archery;
Coaching & Training; and
Stories & Discussion.

The first of these, "traditional archery", included (as a child node) all the Kyudo documents, plus numerous documents from the other two indices, all of which were pertaining to traditional forms of archery. Since not all traditional forms of archery (such as medieval European forms) are the same as Kyudo, it made sense that Kyudo be subsumed in the new node, rather than the other way around.

The new node, "Coaching & Training" emerged because of the failure of Yahoo's "Gear and Instruction" node to align with any nodes of the other indices. A near match was the "Equipment Manufacturers" node, but this match failed to score high enough on the resemblance test (set forth below), essentially because Yahoo's node had the problem of mixing gear and instruction, whereas the other indices separated archery "gear" in its own category. Meanwhile the other indices did not have a dedicated "instruction" category. But since "training/coaching" had been produced by the soft ontology expansion and was linkable to "instruction", it was therefore created as a new node.

Finally, "Stories and Discussion" was devised as a means of uniting several unclassified documents (i.e. those simply categorized under the main "archery" node and not assigned a specific topic) with the "Chats & Forums" of DMOZ. A heuristic can be used for automating this addition of nodes according to the following:

1. Find an expanded concept that is instantiated disproportionately in the document glosses of an unmapped node.
2. Test if that node is instantiated also in numerous documents not classified at a leaf node in a plurality of taxonomies.
3. If such a node is found, then create a new node with that concept and place the relevant documents under it.

As illustrated in FIG. 1, computer system 110 in accordance with an embodiment of the invention includes concept finding module 110 which is operative to find an expanded concept that is instantiated disproportionately in the document glosses of an unmapped node. Computer system 110 also includes test module 120 with is operative to determine if the expanded concept node is instantiated also in numerous documents not classified at a leaf node in a plurality of taxonomies. Node creation module 130 is operative to create a new node with that concept and place the relevant documents under the new node if test module 120 has determined that the expanded concept node is instantiated also in numerous documents not classified at a leaf node in a plurality of taxonomies.

The modules of the preferred embodiment can be software code and/or computer hardware that serves to accomplish the functional steps described herein. The modules can reside on a single computing device or multiple computing devices communicating with one another, such as over a network. The modules can be operative to receive and read the relevant taxonomies and to write data thereto.

FIG. 2 illustrates a method for mapping a taxonomy to at least one other taxonomy, the taxonomies including concepts for organizing information according to an embodiment of the invention. The method includes finding an expanded concept node that is instantiated disproportionately in the document glosses of an unmapped node of the taxonomy (block 210). The method continues by determining if the expanded concept node is instantiated in documents not classified at a leaf node in the at least one other taxonomy (block 220). The method then continues by creating a new node with the unexpanded concept and place the relevant documents under the new node if the expanded concept node is instantiated in documents not classified at a leaf node (block 230).

The overall approach to taxonomy alignment is to combine an intensional and extensional analysis so as to arrive at a mapping between nodes in divergent taxonomies. The intensional method examines the semantics of words in the names of the nodes, and in the titles of documents classified in it, as well as in the glosses applied to those documents by the taxonomy editors. The extensional method need not examine semantics, but only checks the cross-classification of documents that happen to be included in more than one of the taxonomies, coextensive classification as a clue to alignment.

An embodiment of the invention is applied to human-crafted document taxonomies bearing short glosses. These glosses are, by definition, meant to summarize in a few words what the documents are primarily about and what. differentiates each one from others in the same topic. Hence they are valuable input material for semantic resemblance analysis. The content words of the document titles and glosses, as well as bi-grams containing a topic word in any derived form can be used. For example, in the archery category "field archery" and "archer's union", in addition to single words such as "arrows" and "bows" could be used. Then it is determined which of these may be closely related by semantic resemblance. For measuring semantic resemblance, one can test for "semantic proximity" as disclosed in WordNet (Miller 1995), which we define as 'having a maximum distance of 2 in the WordNet hierarchy, with the additional limitations:

1. Only synonyms, hyponyms, hypemyms, and sister-terms are to be considered;
2. Sister-terms are considered proximate only if they share multiple content words in their glosses and/or example sentences in WordNet; and
3. Hypemyms are included only if they are at least 4 levels down in the WordNet hierarchy from the root.

In applications for Web documents or other documents having excessively frequent words, certain words that are excessively frequent across all categories, and hence not useful, can be ignored. In an example of Web documents, these words are included in a preponderance of glosses in DMOZ, such as "photos", "contact details", "site map", etc.) Table 1 shows an outline of a case study that is an embodiment of the invention.

TABLE 1

Comparison of Archery in DMOZ, Yahoo and About.com

| DMOZ | Yahoo | About.com |
|---|---|---|
| Chats & Forums | Bow Hunting | Shop for Archery & Bowhunting Gear |
| Clubs & Associations | Clubs & Organizations | Archery & Bowhunting Gear Manufacturers |
| Equipment Manufacturers | Competitions | Archery & Bowhunting Gear Organizations |
| For Kids and Teens | Gear & Instruction | |
| Guides & Directories | Kyudo | |
| News & Media | Magazines | |
| Personal Pages | National Teams | |
| Tournaments & Events | Web Directories | |

The result of applying the method of the embodiment is, for example, that "clubs" and "organizations" are treated as equivalent terms. Word sense disambiguation is rarely an issue (and so was neglected in this embodiment), as the example is confined to a particular domain. In other words, since we are starting with purely "Archery" documents, there is little need to disambiguate, say, "club" or "bow", which could have completely different senses in other topics besides Archery.

This allows implementation of a simple percentage match scoring of the content words in node names. For example, "Equipment Manufacturers" and "Archery and Bowhunting Gear Manufacturers" receive a score of 0.80, owing to the following facts. First, "Archery" is omitted because it is the same as the overarching topic of "Archery" and hence implicit in all node names. Second, the stop word "and" is discarded. Third, "gear" is matched to "equipment" as a hypernym. That leaves five words total, with only one of them ("bowhunting") lacking a match: hence the score of 415=0.80. In the embodiment, any match greater than 0.66 was deemed sufficient for alignment. The virtue of this node name resemblance test is that it facilitates alignment of, for example, "Clubs and Organizations" with "Clubs and Associations" in two different taxonomies.

However, this still leaves us well short of aligning all the nodes. For example, we still have "Kyudo" and "Gear and Instruction" and "Chat and Forums" in the Archery domain, which either find no semantic resemblance to the names of other nodes, or they find poorly scoring ones. In the case of "Kyudo", the word is not even in WordNet. In the case of "Chat and Forums" in DMOZ, there is simply no correlate in either Yahoo's or About.com's archery listings. And in the case of Yahoo's "Gear and Instruction", the problem is one of having only a small, partial match: "gear" gets related to "equipment," but "instruction" is not like anything at all in the other taxonomy node names, and thus the score never comes close to passing our threshold of 0.66.

Another, issue is that of the numerous documents not assigned a leaf node. In other words, in all three indices, many documents were simply classified in "Archery" without being assigned to a sub-category. In some cases, this seems correct, in that the documents in question were very general archery documents (or websites) not belonging to any particular subclass. But in many other cases, it seemed that a node in a different taxonomy was a natural place for such documents. In other words, while a website of personal stories about archery was classified, in one taxonomy, simply as an "archery" document, if it were viewed against a different taxonomy, it would have found a perfect home in "National Teams". This defeats the taxonomy alignment, in that by merely aligning "Archery" with "Archery" in the two respective taxonomies, it is implied that none of the documents in the one taxonomy belong in "National Teams" of the other—and yet many of them did. This much was obvious from a human point of view, but the embodiment requires an algorithm for handling it.

This predicament led to a soft ontology expansion of all three taxonomies. In other words, it is desirable to enrich the ontological characterization of each specific leaf node, so that it can be aligned with an appropriate subset of the documents lumped together in a more general topic category of a different taxonomy. In order to accomplish this, the method of the preferred embodiment first combine all the documents of all nodes in each taxonomy in a single set. Then, going back to our extracted words and bi-grams (e.g. "calendar" and "field archery", etc.), the words were related in WordNet to look for patterns. To do this, the WordNet glosses and example sentences are examined and compared with collocations and phrases in the document glosses. It was found that, if two words were frequently paired (collocated after skipping non-content words) in the taxonomy document glosses and also were found in each other's Word Net glosses, they were, without exception (in our case studies), genuinely related and of ontological import in the category.

An operational definition of "frequent" is having at least one occurrence in all three taxonomies and having multiple occurrences (2 or more) in at least two of three taxonomies. However, other thresholds can be used to define "frequent." This technique employs WordNet to enrich or develop one's taxonomy and/or ontology. The embodiment drives the process by reference to the glosses already created by editors of the various taxonomies. As a result, the following examples were derived in Archery:

[calendar,schedule] having a relation to [event] [tournament, competition] having relations to both [results] and [standings],[outdoor] having a relation to [ranges], [bow] having relations to [crossbow], [compound bow], and [long bow].

In the embodiment, these are referred to as "concepts" rather than merely "word occurrences" because each is based on a small web of similar words, (e.g. "calendar"~"schedule") rather than a single word and each has an additional small web of word relations ("events," etc.), all of which are contextualized to the overall local topic of Archery. The totality of all such extracted concepts we call a "soft ontology," in that it delineates the raw materials, as it were, of the local ontology, but obviously falls short of a formal representation of the relations between the concept.

Next, when checking the non-leaf-node documents' glosses for the presence of these concepts, and when finding them, then employing the same percentage matching algorithm as above, the embodiment connects some non-leaf-node documents of one taxonomy to leaf nodes of a different taxonomy. For example, several documents containing "U.S." in the DMOZ Archery node, found their way into "National Teams" on the Yahoo taxonomy. In the end, 37 of taxonomy when seen from the point of view of a different taxonomy. In the face of this fact, by leveraging the very substantive and relevant glosses, the embodiment can further granularize a taxonomy by reference to its items' glosses having strong semantic resemblance to those of another taxonomy's leaf nodes, in respect of instantiating the same concepts as derived from the ontology expansion. The inventors conducted several other case studies in the "Sports" domain of all three indices noted above (DMOZ, Yahoo, and About-.com), including topics such as soccer, basketball, and sports injuries, with similar results.

Certain of the soft ontology concepts seem to embrace otherwise isolated nodes of one taxonomy, together with non-leaf node documents of another. A very clear example was that mentioned above, namely, "Kyudo" in the Yahoo directory. The soft ontology expansion had derived "traditional archery" as a bi-gram, with a relation to "history". This was very dense in the Kyudo category (occurring in all but one of its items), and meanwhile applied to 16 non-leaf-node documents from DMOZ, including these three examples:

Donadoni Archery—Supplier of traditional archery equipment in Italy. Lists a wide range of European and US made target and bowhunting products;

The Archery Centre—Specialists in field, traditional, and re-enactment archery equipment. Includes down-load catalogue and hints; and Perris Archery—Recurve, compound and traditional archery equipment suppliers.

Table 2. Results of Alignment

TABLE 2

Results of alignment

| Master | DMOZ | Yahoo | About |
|---|---|---|---|
| Stories & Discussion Chats & Forums | Chats & Forums | Glosses with "stories," "discussion" | Glosses with "stories," "discussion" |
| Organizations | Clubs & Associations | Clubs & Organizations, National Teams | Archery & Bowhunting Organizations |
| Equipment and Gear | Equipment Manufacturers | Glosses with "equipment" and "gear" | Archery & Bowhunting Gear Manufacturers, Shop for Archery & Bowhunting Gear |
| For Kids and Teens | For Kids and Teens | n.a. | n.a. |
| Guides & Directories | Guides & Directories | Web Directories | n.a. |
| News & Media | News & Media | Magazines | n.a. |
| Personal Pages | Personal Pages | n.a. | n.a. |
| Competitions & Events | Tournaments & Events | Competitions | n.a. |
| Bow Hunting | Glosses with "bow hunting" | Bow Hunting | Glosses with "bow hunting" |
| Coaching & Training | Glosses with "instruct", "coach", "train" | Glosses with "instruct", "coach", "train" | Glosses with "instruct", "coach", "train" |
| Traditional Archery Kyudo | Glosses with "traditional" | Kyudo | Glosses with "traditional" |

189 documents were thus "migrated downward" to a leaf node, with the result that, on inspection, it seemed the alignment between taxonomies was more complete and intensionally unequivocal.

This illustrates that taxonomy alignment cannot be divorced from issues of taxonomical scope and adequacy. In other words, if one taxonomy lacks the scope or granularity of another, then the only way to achieve proper alignment is to sort through some of the items in the less granular taxonomy so as to "multiply align" it to other nodes. It is important to note why this is not the same thing as document classification. First, the body content of the documents need not be examined. Secondly, all the documents were already classified; it is just that sometimes they were not completely classified in one The procedure was, in such cases, to use the concept string as a new node name, and to include as a child node the originally isolated node. In other words, the master taxonomy now included "Archery/Traditional Archery/Kyudo," with the three documents above from DMOZ placed in "traditional archery" (a node that had not existed before) and Yahoo's Kyudo documents taking their place in the "Kyudo" node, but now having as its parent the new node, "Traditional Archery." This resulted in a far better alignment than the previous condition of an isolated "Kyudo" category; Kyudo documents now had a closer parent than just being a direct child of "Archery." A new interstitial node of "traditional archery" functions to explain where "Kyudo" belongs in view of all three overlapping taxonomies.

The same is true of "Stories and Discussion" being introduced as a parent of "Chat and Forums", and of "Coaching and Training" as a parent for the "Instruction" documents that Yahoo had mixed in with "Gear". Table 2 shows the overall alignment results. Regarding accuracy, the introduction of new nodes carried just one misclassified document, the key point being that it was "carried", the document had been misclassified already on one of the third party indices. In general, the accuracy of this method will be as good as the accuracy of the classification of the participant taxonomies. In the Archery case above, all the names read nicely, but when we did Soccer, one node received the name "instructing" when "Instruction" arguably is more suitable. Heuristics can be used for selecting a word form or derivation most likely to be preferred by humans as a node name.

The availability of editorially created glosses constitutes a rich resource to guide semantic resemblance analysis, and has the added bonus, when soft ontology expansion is applied via WordNet, to create new interstitial nodes for a more complete and unequivocal alignment of taxonomies. The invention has been described through a preferred embodiment. However, various modifications can be made without departing from the scope of the invention as defined by the appended claims. The invention can be effected with various computing devices and systems programmed in a known manner to carry out the novel functions described herein.

What is claimed is:

1. A method comprising:
   mapping a first set of concept nodes in a first taxonomy to a second set of concept nodes in a second taxonomy by aligning nodes with equivalent concepts in the first taxonomy and second taxonomy to generate a master taxonomy having a plurality of mapped concept nodes, the first set of concept nodes for organizing a first plurality of documents and the second set of concept nodes for organizing a second plurality of documents, each of the first and second plurality of documents associated with a document gloss, each of the mapped concept nodes containing documents from a concept node from the first taxonomy and a concept node from the second taxonomy that are determined to contain equivalent categories of documents;
   after mapping the first set of concept nodes to the second set of concept nodes,
   finding an expanded concept that is instantiated disproportionately in the document glosses of an unmapped node of the first taxonomy;
   determining if the expanded concept is instantiated in documents not classified at any leaf node in the second taxonomy; and
   creating a new node with the expanded concept in the master taxonomy;
   placing documents from the unmapped node and documents associated with the expanded concept from the second taxonomy not classified at any leaf node under the new node if the expanded concept is instantiated in documents not classified at any leaf node in the second taxonomy.

2. The method of claim 1 further comprising reviewing the first taxonomy and the second taxonomy.

3. The method of claim 1 wherein the nodes are categories of the first and second plurality of documents.

4. The method of claim 1 wherein the first and second plurality of documents are websites.

5. The method of claim 1 wherein document glosses are summaries of the first and second plurality of documents in the taxonomies and identify the differentiation of the document from other documents in the taxonomies.

6. The method of claim 1, wherein mapping the first set of concept nodes in the first taxonomy to the second set of concepts in the second taxonomy by aligning nodes with equivalent concepts in the first taxonomy and second taxonomy to generate the master taxonomy having the plurality of concept nodes comprises:
   combining all documents of all nodes in each of the first and second taxonomies in a single set;
   performing a semantic analysis of the documents and the document glosses;
   if two words are frequently paired in the document glosses and in the documents, then the documents are related, wherein the word pairs are the concepts;
   checking the node document glosses for the presence of the concepts; and
   employing a percentage matching algorithm to connect node documents in one taxonomy to leaf nodes of a different taxonomy.

7. A computer readable storage medium having computer executable instructions recorded thereon which cause a computer system to carry out a method when executed, the method comprising:
   mapping a first set of concept nodes in a first taxonomy to a second set of concepts in a second taxonomy by aligning nodes with equivalent concepts in the first taxonomy and second taxonomy to generate a master taxonomy having a plurality of mapped concept nodes, the first set of concept nodes for organizing a first plurality of documents and the second set of concept nodes for organizing a second plurality of documents, each of the first and second plurality of documents associated with a document gloss, each of the mapped concept nodes containing documents from a concept node from the first taxonomy and a concept node from the second taxonomy that are determined to contain equivalent categories for documents;
   after mapping the first set of concept nodes to the second set of concept nodes,
   finding an expanded concept that is instantiated disproportionately in the document glosses of an unmapped node of the first taxonomy;
   determining if the expanded concept is instantiated in documents not classified at any leaf node in the second taxonomy;
   creating a new node with the expanded concept in the master taxonomy; and
   placing the documents from the unmapped node and documents associated with the expanded concept under the new node if the expanded concept from the second taxonomy not classified at any leaf node is instantiated in documents not classified at a leaf node in the second taxonomy.

8. The non-transitory computer readable storage medium of claim 7 further comprising reviewing the first taxonomy and the second taxonomy.

9. The non-transitory computer readable storage medium of claim 7 wherein the nodes are categories of the first and second plurality of documents.

10. The non-transitory computer readable storage medium of claim 7 wherein the first and second plurality of documents are websites.

11. The non-transitory computer readable storage medium of claim 7 wherein document glosses are summaries of the first and second plurality of documents in the taxonomies and identify the differentiation of the document from other documents in the taxonomies.

12. The non-transitory computer readable storage medium of claim 7, wherein mapping the first set of concept nodes in the first taxonomy to the second set of concepts in the second taxonomy by aligning nodes with equivalent concepts in the first taxonomy and second taxonomy to generate the master taxonomy having the plurality of concept nodes comprises:
   combining all documents of all nodes in the first taxonomy and the second taxonomy in a single set;
   performing a semantic analysis of the documents and the document glosses;
   if two words are frequently paired in the document glosses and in the documents, then the documents are related, wherein the word pairs are the concepts; and
   checking the node document glosses for the presence of the concepts; and
   employing a percentage matching algorithm to connect node documents in one taxonomy to leaf nodes of a different taxonomy.

13. A computer system for mapping a taxonomy to at least one other taxonomy, wherein the computer system comprises a non-transitory computer readable storage medium having computer executable instructions recorded thereon which cause a computer system to carry out a method, the taxonomies including concepts for organizing information, the computer system comprising:
   means for mapping a first set of concept nodes in a first taxonomy to a second set of concepts in a second taxonomy by aligning nodes with equivalent concepts in the first taxonomy and second taxonomy to generate a master taxonomy having a plurality of mapped concept nodes, the first set of concept nodes for organizing a first plurality of documents and the second set of concept nodes for organizing a second plurality of documents, each of the first and second plurality of documents associated with a document gloss, each of the mapped concept nodes containing documents from a concept node from the first taxonomy and a concept node from the second taxonomy that are determined to contain equivalent categories of documents;
   after mapping the first set of concept nodes to the second set of concept nodes,
   a concept finding module to find an expanded concept that is instantiated disproportionately in the document glosses of an unmapped node of the first taxonomy;
   a test module to determine if the expanded concept is instantiated in documents not classified at a leaf node in the second taxonomy; and
   a node creation module to create a new node with the expanded concept in the master taxonomy and place documents from the unmapped node and documents associated with the expanded concept under the new node if the expanded concept from the second taxonomy not classified at any leaf node is instantiated in documents not classified at a leaf node in the second taxonomy.

14. The system of claim 13 further comprising means for reviewing the first taxonomy and the second taxonomy.

15. The system of claim 13 wherein the nodes are categories of the first and second plurality of documents.

16. The system of claim 13 wherein the first and second plurality of documents are websites.

17. The system of claim 13 wherein document glosses are summaries of the first and second plurality of documents in the taxonomies and identify the differentiation of the document from other documents in the taxonomies.

18. The system of claim 13, wherein the means for mapping the first set of concept nodes in the first taxonomy to the second set of concepts in the second taxonomy by aligning nodes with equivalent concepts in the first taxonomy and second taxonomy to generate the master taxonomy having the plurality of concept nodes comprises means for:
   combining all documents of all nodes in the first taxonomy and the second taxonomy in a single set;
   performing a semantic analysis of the documents and the document glosses;
   if two words are frequently paired in the document glosses and in the documents, then the documents are related, wherein the word pairs are the concepts; and
   checking the node document glosses for the presence of the concepts; and
   employing a percentage matching algorithm to connect node documents in one taxonomy to leaf nodes of a different taxonomy.

\* \* \* \* \*